United States Patent Office 2,939,209
Patented June 7, 1960

2,939,209
RECONDITIONING OF ELECTRIC APPARATUS

Harvey J. Schwartz, Warrensville Heights, Ohio, assignor to Horizons Incorporated, Cleveland, Ohio, a corporation of New Jersey No Drawing. Filed May 1, 1958, Ser. No. 732,142

3 Claims. (Cl. 29—401)

This invention relates to a process useful in the rebuilding of electrical apparatus such as motors or generators, and more particularly to the treatment of armatures or stators of such apparatus.

Before the armature or stator of a burned-out generator or motor can be rewound, it must first be stripped of its field coils and then thoroughly cleaned. In the past this has been a difficult operation which has been accomplished mechanically only after a considerable expenditure of time and often with some physical damage to the remaining structure. Furthermore, the material removed is not in a condition such that it can be used directly in the fabrication of new apparatus, because the imperfect coating remains on the wire.

By the present invention, the stator is chemically treated in a simple operation so as to facilitate the stripping of the winding, and the recovery of a wire product substantially freed from the organic and non-metallic coverings previously encasing the coil of wires. After the treatment the coils are readily detached from the stator and both the stator and wire are useable without further processing.

Briefly in accordance with the process devised by me an armature or stator having a burned out winding is immersed in a melt of fused salt until the insulation is removed from the coil by action of the salt bath. Thereafter the field coils may be separated from the stator either by slipping them off if there is sufficient clearance, or by clipping them. The body of the armature is cleaned of dirt and grease by the salt bath so that a single operation effectively reconditions both the winding—for reuse as scrap metal—and the core—for rebuilding.

I have successfully applied my process to the reconditioning of automobile generators, electric motors and other similar equipment. To obtain satisfactory results, however, it is necessary that certain variables be controlled during the operation.

The fused salt melt may be composed of any one or several alkali metal salts including: halides and particularly chlorides, nitrites, nitrates, sulfates, carbonates and hydroxides have been found suitable. Preferably the bath is formed of ingredients which do not decompose at the intended temperature of operation.

The temperature at which I prefer to operate is well below the melting point of the armature or stator and of the winding to be removed, in order to minimize any warpage or distortion of the shaft carrying the armature and to minimize the decomposition of any of the bath constituents.

Alkali metal nitrites, and particularly sodium nitrite, operated at between 600° F. and 800° F. has been found to be particularly effective for my purpose.

The following examples will serve to further illustrate certain aspects of my invention and are to be taken as illustrative rather than limitative thereof.

Example 1

A fused salt bath was prepared by melting approximately 75 pounds of sodium nitrite in a steel pot. The end plates of a burned-out $\frac{1}{20}$ H.P. electric motor were removed from the motor casing before immersion to allow free circulation of the bath in the motor casing. After the bath had reached a temperature of about 750° F., the motor, supported in a mesh-basket, was immersed in the molten salt for about 25 minutes. The basket was moved through the bath from time to time to promote a more complete contact between the motor and the salt. At the end of about 25 minutes, the motor was withdrawn from the melt and it was observed that all traces of insulation and grease were removed. At the same time, the field coils remained loosely attached to the armature and were readily removed by clipping them with wire clippers. The recovered metals and the armature were rinsed separately in water to remove any salt residue and were then dried.

Example 2

The procedure of Example 1 was repeated with an automobile generator, with similar results.

By the procedure described, much of the hand labor required for removing the burned out coils from the armature has been eliminated, with consequent decrease in expense.

Having now described my invention in accordance with the patent statutes, I claim:

1. A process for reconditioning burned-out electric apparatus which comprises: preparing a molten bath consisting essentially of sodium nitrite; immersing the electric apparatus therein for about one half hour while maintaining the bath temperature between about 600° F. and 800° F., thereby effecting removal of insulation from the coils in said apparatus; and separating the bare coils from the remainder of the apparatus.

2. A process for reconditioning burned-out electric apparatus comprising an armature or stator with a burned-out wire winding having a protective coating thereon which process comprises: preparing a treating bath composed of at least one molten alkali metal salt; immersing the electric apparatus therein for a time sufficient to remove the insulation from the burned-out coils and sufficient to remove grease and dirt from the remainder of the electrical apparatus, while maintaining the molten alkali metal salt bath at a temperature below the melting point of the armature or stator being reconditioned and at a temperature above the melting point of the molten salt constituting the bath and below the temperature at which such salts decompose; withdrawing the apparatus from the molten salt and then separating the bare coils produced by said treatment from the remainder of the electric apparatus.

3. The method of reconditioning burned-out electric apparatus according to the process of claim 2 wherein the bare coils are separated from the armature or stator by severing the bare wires constituting said coils, whereby they may be readily detached from the stator or armature.

References Cited in the file of this patent

UNITED STATES PATENTS

| | | |
|---|---|---|
| 1,342,703 | Wright | June 8, 1920 |
| 1,714,879 | Lang | May 28, 1929 |
| 1,749,939 | Heller | Mar. 11, 1930 |
| 2,269,219 | Miller | Jan. 6, 1942 |
| 2,423,345 | Roters | July 1, 1947 |
| 2,636,408 | Mitchell | Apr. 28, 1953 |
| 2,668,925 | Blosser | Feb. 9, 1954 |